US012008760B2

(12) United States Patent
Merlet et al.

(10) Patent No.: US 12,008,760 B2
(45) Date of Patent: Jun. 11, 2024

(54) SYSTEMS AND METHODS FOR ESTIMATING THE MOVEMENT OF A TARGET USING A UNIVERSAL DEFORMATION MODEL FOR ANATOMIC TISSUE

(71) Applicant: Covidien LP, Mansfield, MA (US)

(72) Inventors: Nicolas J. Merlet, Jerusalem (IL); Oren P. Weingarten, Hod-Hasharon (IL); Ariel Birenbaum, Raanana (IL); Alexander Nepomniashchy, Herzliya (IL); Evgeni Kopel, Barkan (IL); Guy Alexandroni, Yehud-Monosson (IL)

(73) Assignee: Covidien LP, Mansfield, MA (US)

( * ) Notice: Subject to any disclaimer, the term of this patent is extended or adjusted under 35 U.S.C. 154(b) by 193 days.

(21) Appl. No.: 17/373,400

(22) Filed: Jul. 12, 2021

(65) Prior Publication Data
US 2022/0028081 A1    Jan. 27, 2022

Related U.S. Application Data

(60) Provisional application No. 63/056,549, filed on Jul. 24, 2020.

(51) Int. Cl.
G06T 7/00       (2017.01)
G06T 3/20       (2006.01)
(Continued)

(52) U.S. Cl.
CPC .............. *G06T 7/0016* (2013.01); *G06T 3/20* (2013.01); *G06T 3/4007* (2013.01); *G06T 3/60* (2013.01);
(Continued)

(58) Field of Classification Search
CPC ....... G06T 7/0016; G06T 3/20; G06T 3/4007; G06T 3/60; G06T 7/149; G06T 7/344;
(Continued)

(56) References Cited

U.S. PATENT DOCUMENTS 7,352,370 B2    4/2008   Wang et al.
8,358,818 B2    1/2013   Miga et al.
(Continued)

FOREIGN PATENT DOCUMENTS

BR    0013237 A    7/2003
BR    0116004 A    6/2004
(Continued)

OTHER PUBLICATIONS

U.S. Appl. No. 63/056,549, filed Jul. 24, 2020, Nicolas J. Merlet.
(Continued)

*Primary Examiner* — Chan S Park
*Assistant Examiner* — Daniel C Chang
(74) *Attorney, Agent, or Firm* — Weber Rosselli & Cannon LP

(57) ABSTRACT

Systems and methods of estimating movement of anatomical structures of a new patient include learning one or more deformation models from preoperative and intraoperative imaging data of a set of other patients and estimating movement of anatomical structures of the new patient based on the one or more deformation models and preoperative imaging data of the new patient. Estimating movement of the anatomical structures may include applying deformation models to map data derived from preoperative imaging data of a new patient to obtain deformed map data for each deformation model, and determining the deformation model that best fits the intraoperative imaging data of the new patient. Applying a deformation model to map data may include applying a transformation to the deformation model (Continued)

and interpolating to obtain a deformed map data. Registration is computed between locations of a medical device sampled during navigation of the medical device through the new patient and the original and deformed map data. The map data which fits the 3D locations the best is applied to the targets of the new patient.

14 Claims, 9 Drawing Sheets

(51) Int. Cl.
*G06T 3/4007* (2024.01)
*G06T 3/60* (2006.01)
*G06T 7/149* (2017.01)
*G06T 7/33* (2017.01)
*G06T 7/37* (2017.01)
*G06T 17/20* (2006.01)

(52) U.S. Cl.
CPC .............. *G06T 7/149* (2017.01); *G06T 7/344* (2017.01); *G06T 7/37* (2017.01); *G06T 17/20* (2013.01); *G06T 2207/10028* (2013.01); *G06T 2207/10081* (2013.01); *G06T 2207/20081* (2013.01); *G06T 2207/30061* (2013.01)

(58) Field of Classification Search
CPC . G06T 7/37; G06T 17/20; G06T 2207/10028; G06T 2207/10081; G06T 2207/20081; G06T 2207/30061; G06T 7/33; G06T 7/207; G06T 7/62; G06T 7/73; G06T 19/003; G06T 2207/30008; G06T 2207/30021; A61B 6/032; A61B 6/4085; A61B 6/5235; A61B 6/5264; G06F 18/22
See application file for complete search history.

(56) References Cited

U.S. PATENT DOCUMENTS

| | | | |
|---|---|---|---|
| 8,666,128 | B2 | 3/2014 | Chaney et al. |
| 9,269,140 | B2 | 2/2016 | Machado |
| 10,085,671 | B2 | 10/2018 | Duindam et al. |
| 2015/0305650 | A1 | 10/2015 | Hunter et al. |
| 2018/0311013 | A1* | 11/2018 | Tanikawa ............... G16H 30/40 |
| 2018/0330497 | A1* | 11/2018 | Kapoor ............... A61B 5/1073 |
| 2019/0172371 | A1 | 6/2019 | Eckert et al. |
| 2020/0175307 | A1* | 6/2020 | Kamen ............... G06V 10/764 |
| 2020/0179060 | A1 | 6/2020 | Kopel et al. |
| 2020/0321099 | A1* | 10/2020 | Holladay ............... G16H 30/40 |
| 2020/0352427 | A1 | 11/2020 | Deyanov |
| 2020/0383750 | A1 | 12/2020 | Kemp et al. |

FOREIGN PATENT DOCUMENTS

| | | |
|---|---|---|
| MX | PA03005028 A | 1/2004 |
| MX | 225663 B | 1/2005 |
| MX | 226292 | 2/2005 |
| MX | 246862 B | 6/2007 |
| MX | 265247 | 3/2009 |
| MX | 284569 B | 3/2011 |

OTHER PUBLICATIONS

Extended European search report issued in European Patent Application No. 21186348.5 dated Dec. 2, 2021.
Jud Christoph et al: "A Localized Statistical Motion Model as a Reproducing Kernel for Non-rigid Image Registration", Lecture Notes in Computer Science LNCS 10434, Medical Image Computing and Computer-Assisted Intervention − MICCAI 2017 20th Int. Conf., Quebec City, QC, Canada, Sep. 11-13, 2017, Proceedings, Part II, Jan. 1, 2017 (Jan. 1, 2017), XP055862950.
Nakao Megumi et al: "Surface deformation 1-15 analysis of collapsed lungs using model-based shape matching", International Journal of Computer Assisted Radiology and Surgery, Springer, DE, vol. 14, No. 10, Jun. 27, 2019 (Jun. 27, 2019), pp. 1763-1774, XP036908864.

* cited by examiner

SYSTEMS AND METHODS FOR ESTIMATING THE MOVEMENT OF A TARGET USING A UNIVERSAL DEFORMATION MODEL FOR ANATOMIC TISSUE

CROSS-REFERENCE TO RELATED APPLICATIONS

This application claims the benefit of U.S. Application No. 63/056,549.

FIELD

The disclosed technology is generally related to estimating the movement of anatomy and targets in a new patient using learned deformation models.

BACKGROUND

Clinicians deal with soft organs or tissues subject to deformations at different times. The locations of specific points (e.g., lesions) may be known at an initial time using medical imaging. However, at a later time, new locations of the specific points in a patient's anatomy may not be known without performing the same medical imaging.

For example, during a procedure, a clinician may know the location of a lesion in a CT scan of the lungs performed previously, e.g., one or more weeks ago. However, between the CT scan and the procedure the lungs may become deformed because of a variety of factors including breathing, catheter pressure, body movement, and illness, which leads to "CT-to-body divergence."

SUMMARY

The techniques of this disclosure generally relate to generating deformation models for estimating movement of anatomical structures and estimating movement of the anatomical structure using the deformation models. In one aspect, the disclosure provides a method. The method includes receiving, for each patient of a set of patients, preoperative imaging data of a first imaging modality and intraoperative imaging data of a second imaging modality. The method further includes generating deformation models from the preoperative and intraoperative imaging data, and applying each deformation model of the deformation models to preoperative imaging data of a new patient to obtain deformed imaging data for each deformation model. The method further includes comparing, for each deformation model, the deformed imaging data to intraoperative data of the new patient, and determining the deformation model that best fits the intraoperative data of the new patient based on the comparing.

Implementations may include one or more of the following features. The intraoperative data of the new patient may include at least one of imaging data or navigation data The method may include registering, for each patient of the set of patients, the preoperative imaging data of the first imaging modality to a second image of a second imaging modality, registering images of the preoperative imaging data with each other, registering different deformations of the set of patients into a common deformation space, and determining a set of deformation models representing the different possible deformations.

Registering the images of the preoperative imaging data to images of the intraoperative imaging data may include at least one of rotating and translating the images of the preoperative imaging data. Registering the images of the preoperative imaging data with each other may include at least one of scaling, rotating, and translating the images of the preoperative imaging data. The first imaging modality may be computed tomography (CT) and the second imaging modality may be cone beam CT (CBCT).

Registering the images of the preoperative imaging data to the images of the intraoperative imaging data may include applying an interpolation process to an airway skeleton of the images of the preoperative imaging data to obtain an equivalent airway skeleton in a coordinate system of the images of the intraoperative imaging data, performing automatic registration between the equivalent airway skeleton and an airway distance map of the images of the preoperative imaging data to obtain a transformation, and applying the transformation to coordinates of second 3D control points of the images of the intraoperative imaging data to obtain movement of the second 3D control points in the coordinate system of the image of the preoperative imaging data. The interpolation process may include a thin plate spline (TPS) process.

Registering the images of the preoperative imaging data with each other may include: selecting a reference image of the preoperative imaging data, performing registration between an airway skeleton of a current image of the preoperative imaging data and an airway distance map of the reference image of the preoperative imaging data to obtain a second transformation, and applying the second transformation to the movement of the second 3D control points. The method may include creating a mesh grid for first 3D control points of the reference image of the preoperative imaging data, and applying an interpolating process to the mesh grid relative to the movement of the first 3D control points of the current image of the preoperative imaging data to obtain a standardized mesh grid.

The method may include determining a similarity measure between mesh grids of pairs of images of the preoperative imaging data, respectively, and generating a first deformation model of images of the preoperative imaging data closest to a first center image of the preoperative imaging data based on the similarity measure. The similarity measure between two mesh grids may be an average Euclidean distance between first 3D control points of the two images of the preoperative imaging data, respectively. The similarity measure may be between two mesh grids of the images of the intraoperative imaging data, between mesh grids of an image of the preoperative imaging data and an image of the intraoperative imaging data, or between a mesh grid of an image of the intraoperative imaging data and a model grid.

The method may include generating a second deformation model of images of the preoperative imaging data closest to a second center image of the preoperative imaging data based on the similarity measure, compute, for each patient, the minimum of the similarity measure and each of the mesh grids of the first deformation model and the second deformation model to obtain scores, and selecting the first deformation model or the second deformation model having a lowest score to perform a transformation. The first and second 3D control points may be crossing points of at least one of arteries, veins, and airways in the images of the preoperative imaging data and the images of the intraoperative imaging data, respectively.

In another aspect, the disclosure provides another method. The method includes obtaining three-dimensional (3D) samples from intraoperative data of a new patient and applying an inverse of a transformation to movement points of a deformation model in a coordinate system of the intraoperative data of the new patient to obtain a transformed at least one deformation model. The method also includes creating a deformed distance map and deformed targets based on the intraoperative data of the new patient and the transformed deformation model.

The method also includes computing registration between the 3D samples and the deformed distance map to obtain a deformed registration, and computing automatic registration between the 3D samples and an original distance map to obtain an original registration. The method also includes determining that the original distance map or the deformed distance map fits the 3D samples the best, applying the original registration to original targets in response to determining that the original distance map fits the 3D samples the best, and applying the deformed registration to the deformed targets in response to determining that the deformed distance map fits the 3D samples the best.

Implementations may include one or more of the following features. The method may include registering the preoperative images of the new patient to the preoperative images of a reference patient to obtain the transformation. The obtaining, applying, creating, computing, determining, and applying may be performed for patients of a training set. The method may include selecting a combination of deformation models leading to the minimum error of location of the target. The obtaining, applying, creating, computing automatic registration, determining, and applying may be performed again for a validation set of patients to confirm that there is no overfitting. The deformation model may include a deformation model for inhale and a deformation model for exhale.

In another aspect, the disclosure provides still another method. The method includes receiving preoperative imaging data and deformation models, and registering the preoperative imaging data with each other to obtain a transformation. The method also includes obtaining samples from intraoperative data of a new patient, applying the transformation to the deformation models in a coordinate system of the preoperative imaging data of the new patient to obtain transformed deformation models, and generating deformed distance maps and deformed targets based on the preoperative imaging data of the new patient and the transformed deformation models. The method also includes determining a distance map from the deformed distance maps that fits the samples the best, and estimating movement of the target by applying the determined distance map to the deformed targets.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
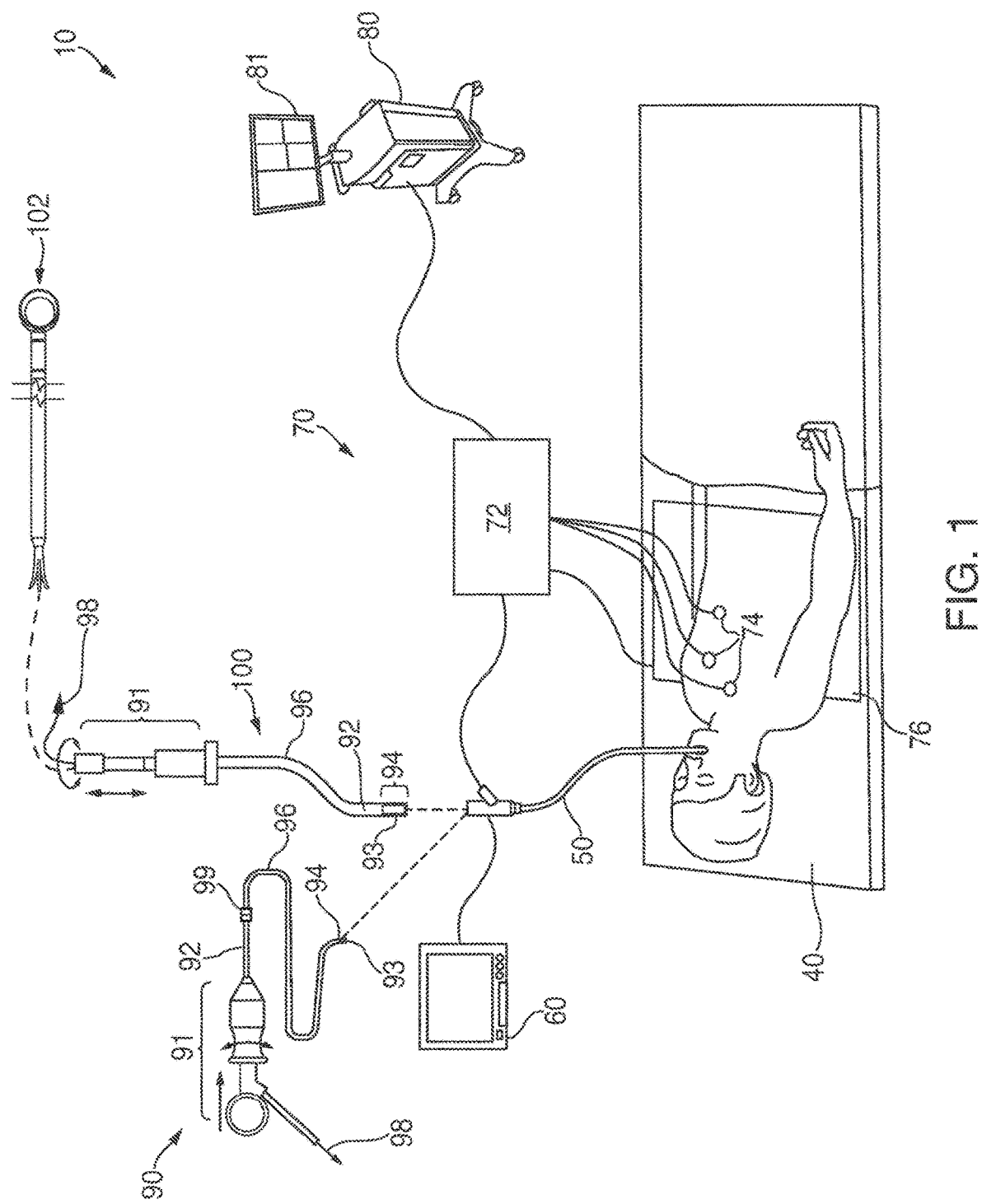
FIG. 1 is a perspective view of an electromagnetic navigation system in accordance with this disclosure.

In an image-guided procedure, preoperative imaging data may be obtained and used to create planning information for the procedure. Then, during the operative procedure, preoperative imaging data is registered with intraoperative data in order to use the planning information in conjunction with the intraoperative data. However, there may be deformations between the preoperative imaging data (e.g., CT imaging data) and the intraoperative data (e.g., CBCT imaging data), which, in the case of preoperative CT imaging data, may be referred to as CT-to-body divergence. Also, during a procedure, imaging data or at least data that is sufficient for generating an accurate navigation map may not be available. The only information about the intraoperative airway tree deformation may be sample locations of a medical device being navigated through the airway tree. The systems and methods of this disclosure generate and use a universal anatomical deformation model (e.g., a universal organ or lung deformation model) for a navigation system to obtain improved accuracy in registration between the preoperative imaging data and intraoperative data, which may include imaging data or navigation data.

The universal or generic deformation model may be developed based on preoperative CT imaging data and intraoperative CT imaging data (which may be obtained by a CBCT machine) for a set of patients. Then, matching pairs of anatomical points may be manually or automatically marked in the preoperative and intraoperative CT imaging data.

The systems and methods of this disclosure register many patients of different shapes and sizes (e.g., wide and narrow and large and small patients) onto one coordinate system, such that after the registration or alignment process the deformation model can be generalized to be a deformation field in the one coordinate system. The coordinate system may be the coordinate system of the CT imaging data of one of the patients used to develop the deformation model. Thus, a specific new patient can be registered to the coordinate system of the deformation model. A reverse registration process may be applied to the deformation field to adjust the generic deformation model to the preoperative imaging data (e.g., CT imaging data) of the specific new patient.

Optionally, multiple deformation models may be created by clustering a set of patients into different types of deformations. For a specific new patient, a deformation model may be selected from the multiple deformation models based on which deformation model results in a more accurate fit of a registration survey (e.g., an automatic-registration survey) to a 3D map, which may be generated based on 3D locations of a catheter sampled during navigation of the catheter, e.g., during navigation of the catheter in the lungs. Additionally, or alternatively, information collected during the procedure may be used to select which deformation model is best adapted to the new patient.

After a deformation model is developed or selected from multiple deformation models, the deformation model is used to precisely predict the new location of one or more characteristic points of an anatomical feature, e.g., a lung lesion, for unknown, new patients.

The deformation model may be used by an electromagnetic navigation (EMN) system, e.g., an electromagnetic navigation bronchoscopy (ENB) system. For example, the deformation model may be used to deform the preoperative CT data to create a new CT volume, which may be used instead of the preoperative CT in the navigation system. The system may register to the new CT volume and may also transform the entire plan, which may include a pathway, one or more manual registration points, and one or more planned targets, according to the deformation model. During navigation, the new CT volume created from the deformed preoperative CT data may be displayed in the EMN system views.

Alternatively, after calculating the registration to the new CT volume, instead of transforming sensor positions to the new CT volume, the sensor positions are transformed to the preoperative CT images by a registration process, which includes transforming the sensor positions to the coordinate system of the new CT volume, and transforming sensor positions from the coordinates of the new CT volume to the coordinates of the preoperative CT images based on the deformation model. In this alternative, the preoperative CT images may be displayed to the user without needing to modify the plan.

The systems and methods of this disclosure may have positive impacts with respect to both the success of procedures and the performance of medical devices needing precise localization of an anatomical target such as lesions or organ parts. Detailed embodiments of such systems and methods are described below. However, these detailed embodiments are merely examples of the disclosure, which may be embodied in various forms. Therefore, specific structural and functional details disclosed herein are not to be interpreted as limiting, but merely as a basis for the claims and as a representative basis for allowing one skilled in the art to variously employ the present disclosure in virtually any appropriately detailed structure. While the examples described below are described in the context of obtaining 3D sample locations of a catheter in the lungs of a patient, those skilled in the art will realize that the same or different embodiments may also be used in other organs or lumen networks, such as, for example, the vascular, lymphatic, and/or gastrointestinal networks.

Aspects of this disclosure generally include at least one sensor whose position is tracked within an electromagnetic field. The location sensor may be incorporated into a catheter or other different types of tools, and enables determination of the current location of the catheter or tools within a patient's airways by comparing the sensed location in space to locations within a 3D model of a patient's airways.

With reference to FIG. 1, an electromagnetic navigation (EMN) system 10 is provided. One such EMN system is the ELECTROMAGNETIC NAVIGATION BRONCHOSCOPY® system. Among other tasks that may be performed using the EMN system 10 are obtaining 3D locations of a catheter within the lungs, determining a location of a target of a new patient based on the 3D locations of the catheter and deformation models, planning a pathway to target tissue, navigating a positioning assembly to the target tissue, navigating a biopsy tool to the target tissue to obtain a tissue sample from the target tissue using the biopsy tool, digitally marking the location where the tissue sample was obtained, and placing one or more echogenic markers at or around the target.

EMN system 10 generally includes an operating table 40 configured to support a patient; a bronchoscope 50 configured for insertion through the patient's mouth and/or nose into the patient's airways; monitoring equipment 60 coupled to bronchoscope 50 for displaying video images received from bronchoscope 50; a tracking system 70 including a tracking module 72, reference sensors 74, and an electromagnetic field generator 76; a workstation 80 including software and/or hardware used to facilitate pathway planning, identification of target tissue, navigation to target tissue, and digitally marking the biopsy location FIG. 1 also depicts two types of catheter guide assemblies 90, 100. Both catheter guide assemblies 90, 100 are usable with EMN system 10 and share a number of common components. Each catheter guide assembly 90, 100 includes a handle 91, which is connected to an extended working channel (EWC) 96. EWC 96 is sized for placement into the working channel of a bronchoscope 50. In operation, a locatable guide (LG) 92, including an electromagnetic (EM) sensor 94, is inserted into EWC 96 and locked into position such that EM sensor 94 extends a desired distance beyond a distal tip 93 of EWC 96. The location of EM sensor 94, and thus the distal end of EWC 96, within an electromagnetic field generated by electromagnetic field generator 76 can be derived by tracking module 72, and workstation 80. Catheter guide assemblies 90, 100 have different operating mechanisms, but each contain a handle 91 that can be manipulated by rotation and compression to steer distal tip 93 of LG 92 and EWC 96. Catheter guide assemblies 90 are currently marketed and sold by Covidien LP under the name SUPERDIMENSION® Procedure Kits. Similarly, catheter guide assemblies 100 are currently sold by Covidien LP under the name EDGE™ Procedure Kits. Both kits include a handle 91, EWC 96, and LG 92.

As illustrated in FIG. 1, the patient is shown lying on operating table 40 with bronchoscope 50 inserted through the patient's mouth and into the patient's airways. Bronchoscope 50 includes a source of illumination and a video imaging system (not explicitly shown) and is coupled to monitoring equipment 60, e.g., a video display, for displaying the video images received from the video imaging system of bronchoscope 50.

Catheter guide assemblies 90, 100 including LG 92 and EWC 96 are configured for insertion through a working channel of bronchoscope 50 into the patient's airways (although the catheter guide assemblies 90, 100 may alternatively be used without bronchoscope 50). LG 92 and EWC 96 are selectively lockable relative to one another via a locking mechanism 99. A six degrees-of-freedom electromagnetic tracking system 70, or any other suitable positioning measuring system, is utilized for performing navigation, although other configurations are also contemplated. Tracking system 70 is configured for use with catheter guide assemblies 90, 100 to track the position of EM sensor 94 as it moves in conjunction with EWC 96 through the airways of the patient.

As shown in FIG. 1, electromagnetic field generator 76 is positioned beneath the patient. Electromagnetic field generator 76 and the reference sensors 74 are interconnected with tracking module 72, which derives the location of each reference sensor 74. One or more of reference sensors 74 are attached to the chest of the patient. The coordinates of reference sensors 74 are sent to workstation 80, which includes and application 81 which uses data collected by sensors 74 to calculate a patient coordinate frame of reference.

Also shown in FIG. 1 is a catheter biopsy tool 102 that is insertable into catheter guide assemblies 90, 100 following navigation to a target and removal of LG 92. Biopsy tool 102 is used to collect one or more tissue samples from the target tissue. As detailed below, biopsy tool 102 is further configured for use in conjunction with tracking system 70 to facilitate navigation of biopsy tool 102 to the target tissue, tracking of a location of biopsy tool 102 as it is manipulated relative to the target tissue to obtain the tissue sample, and/or marking the location where the tissue sample was obtained.

Although navigation is detailed above with respect to EM sensor 94 being included in LG 92 it is also envisioned that EM sensor 94 may be embedded or incorporated within biopsy tool 102 where biopsy tool 102 may alternatively be utilized for navigation without need of LG 92 or the necessary tool exchanges that use of LG 92 requires.

During procedure planning, workstation 80 may utilize intraoperative cone beam computed tomography (CBCT) image data for generating and viewing a current 3D model of the patient's airways, enables the identification of target tissue on the 3D model (automatically, semi-automatically or manually), and allows for the selection of a pathway through the patient's airways to the target tissue. However, according to aspects of this disclosure, preoperative CT scans are processed using deformation models to generate a current 3D model of the patient's airways without the need for intraoperative CBCT images.

The 3D model may be presented on a display monitor associated with workstation 80, or in any other suitable fashion. Using workstation 80, various slices of the 3D volume and views of the 3D model may be presented and/or may be manipulated by a clinician to facilitate identification of a target and selection of a suitable pathway through the patient's airways to access the target. The 3D model may also show marks of the locations where previous biopsies were performed, including the dates, times, and other identifying information regarding the tissue samples obtained. These marks may also be selected as the target to which a pathway can be planned. Once selected, the pathway is saved for use during the navigation procedure.

During navigation, EM sensor 94, in conjunction with tracking system 70, enables tracking of EM sensor 94 and/or biopsy tool 102 as EM sensor 94 or biopsy tool 102 is advanced through the patient's airways. In aspects, the EM sensor 94 may be used to obtain 3D samples according to the methods of this disclosure.

Figure 2:
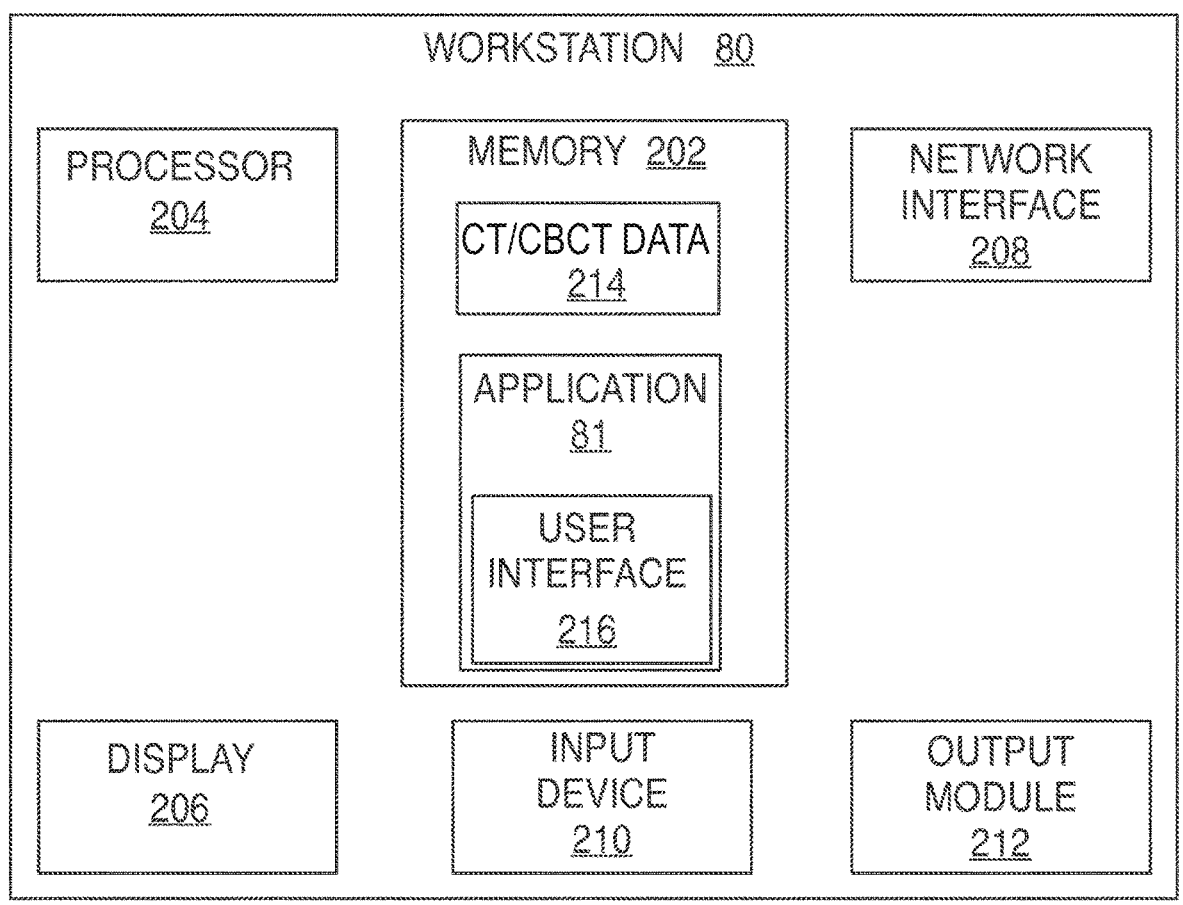
FIG. 2 is a schematic diagram of a workstation configured for use with the system of FIG. 1.

FIG. 2 shows a system diagram of a workstation 80. Workstation 80 may include memory 202, processor 204, display 206, network interface 208, input device 210, and/or output module 212. Memory 202 includes any non-transitory computer-readable storage media for storing data and/or software that is executable by processor 204 and which controls the operation of workstation 80. In one implementation, memory 202 may include one or more solid-state storage devices such as flash memory chips. Alternatively, or additionally, to the one or more solid-state storage devices, memory 202 may include one or more mass storage devices connected to the processor 204 through a mass storage controller (not shown) and a communications bus (not shown).

Although the description of computer-readable media contained herein refers to a solid-state storage, it should be appreciated by those skilled in the art that computer-readable storage media can be any available media that can be accessed by the processor 204. That is, computer readable storage media includes non-transitory, volatile and non-volatile, removable and non-removable media implemented in any method or technology for storage of information such as computer-readable instructions, data structures, program modules or other data. For example, computer-readable storage media includes RAM, ROM, EPROM, EEPROM, flash memory or other solid state memory technology, CD-ROM, DVD, Blu-Ray or other optical storage, magnetic cassettes, magnetic tape, magnetic disk storage or other magnetic storage devices, or any other medium which can be used to store the desired information, and which can be accessed by workstation 80.

Memory 202 may store application 81 and/or CT/CBCT data 214. Application 81 may, when executed by processor 204, cause processor 204 to perform the methods of FIGS. 4 and 5, and cause display 206 to present a user interface 216 and 3D models generated according to the methods of this disclosure. Network interface 208 may be configured to connect to a network such as a local area network (LAN) consisting of a wired network and/or a wireless network, a wide area network (WAN), a wireless mobile network, a Bluetooth network, and/or the internet. Input device 210 may be any device through which a user may interact with workstation 80, such as, for example, a mouse, keyboard, foot pedal, touch screen, and/or voice interface. Output module 212 may include any connectivity port or bus, such as, for example, parallel ports, serial ports, universal serial busses (USB), or any other similar connectivity port known to those skilled in the art.

The methods of this disclosure involve learning different anatomic deformation models of soft organs in a set of patients using a systematic search. In principle, no regular pattern should be missed in the learning process. The methods of this disclosure also involve applying the different deformation models to predict the type of deformation of the soft organs and a new position of the targets, such as lesions. The methods further utilize information collected during the procedure to select one or more relevant deformation models. In one aspect, the methods of this disclosure include computing clusters of patients having similar deformation models, and selecting a few characteristic clusters covering the characteristic deformation of most patients.

The methods of this disclosure also predict anatomic movements from a learned deformation model. The internal movements of a soft organ or tissue are considered at two or more points in time. A patient's lungs may be imaged a first time using CT scan and imaged a second time several weeks later during a surgical operation using a CBCT scanner.

These anatomic movements are modeled for a series of training patients, in order to predict the anatomic movements for a new unknown patient, assuming that the anatomic movements follow common empiric rules. For example, a cancerous lung lesion is located on the CT scans and the position of the cancerous lung lesion is precisely estimated during the operation, for the purpose of biopsy, ablation, or other treatment.

The learning process may use a set of patients, which may include a few dozen patients to several hundred patients. For each of the patients, clinicians (e.g., physicians) interactively define the location of 3D control points, e.g., 50-100 3D control points, both before and after anatomic movements. Each 3D control point may be characterized by two 3D locations at the two selected times. These movements may be caused by breathing, by the presence of a catheter, by different body positions, or by developments of an illness. These various causes produce "CT-to-body divergence".

Figure 3:
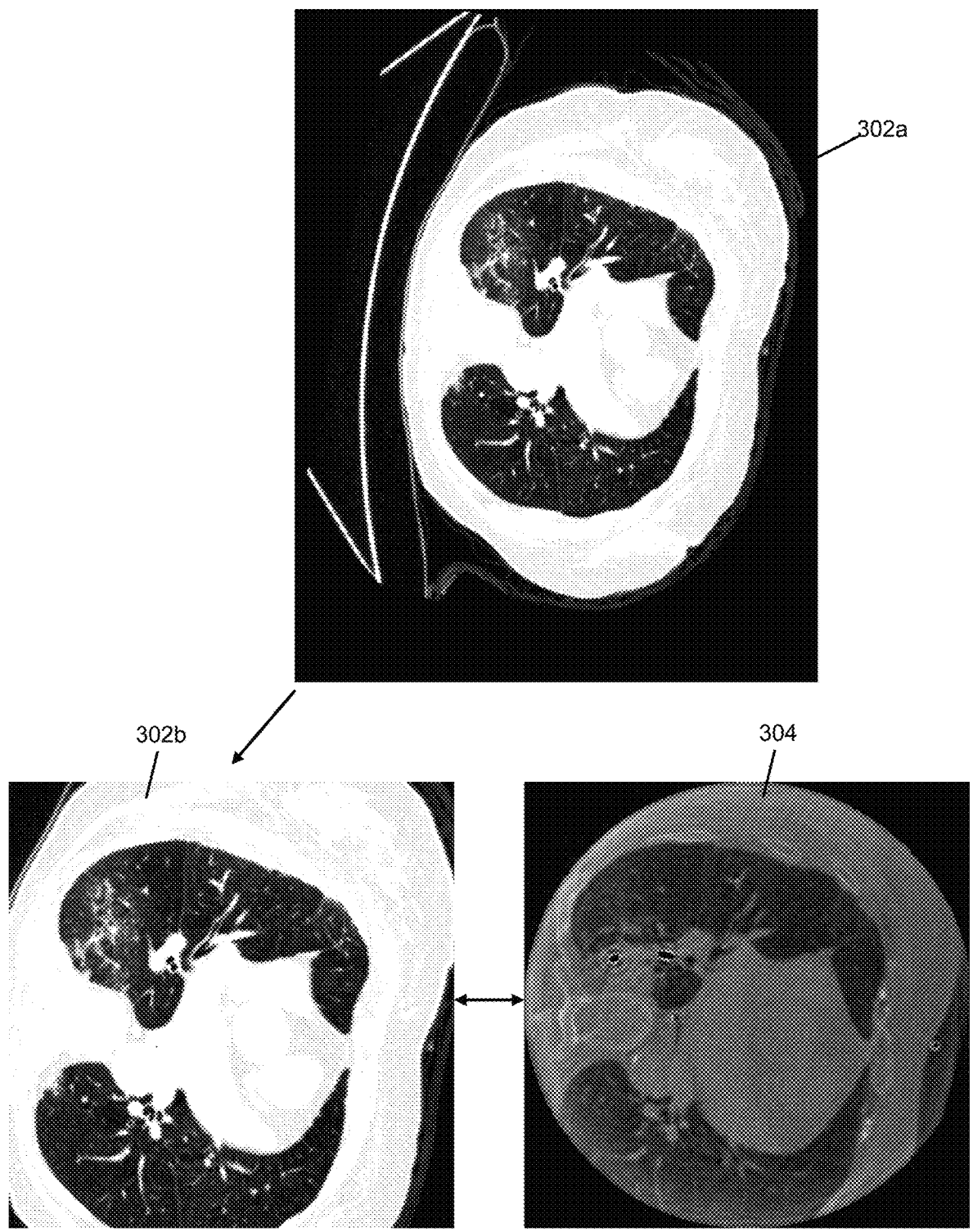
FIG. 3 is a diagram that illustrates registration of the CT images to the CBCT images.

In aspects, the 3D control points are crossing points of the arteries, veins, and airways, which provides a sufficient amount of 3D precision. The 3D control points, which are illustrated in FIG. 3, are defined in both a CT image 302a, 302b (CT image 302b is an enlarged version of CT image 302a) and in cone-bean-CT (CBCT) images 304 obtained during a surgical procedure.

The systems and methods of this disclosure involve: (1) learning one or more models from preoperative and intraoperative imaging data of learning patients, and predicting the movement of a new patient by applying one of the one or more learned models to the preoperative imaging data, which includes a target, e.g., a lesion, of the new patient. The methods of this disclosure also use various image processing techniques, which include: interpolation such as the thin plate spline (TPS); automatic registration (AR); and lung segmentation (LS) to segment the lung pleura and the airways with their skeleton.

In aspects, for each patient of a set of patients, preoperative imaging data of a first imaging modality and intraoperative imaging data of a second imaging modality are received. Deformation models are generated from the preoperative and intraoperative imaging data. Each deformation model of the deformation models is applied to preoperative imaging data of a new patient to obtain deformed imaging data for each deformation model. For each deformation model, the deformed imaging data is compared with preoperative data of the new patient. Then, the deformation model that best fits the preoperative data of the new patient is determined based on the comparing. The preoperative data of the new patient may include imaging data and/or navigation data.

Figure 4:
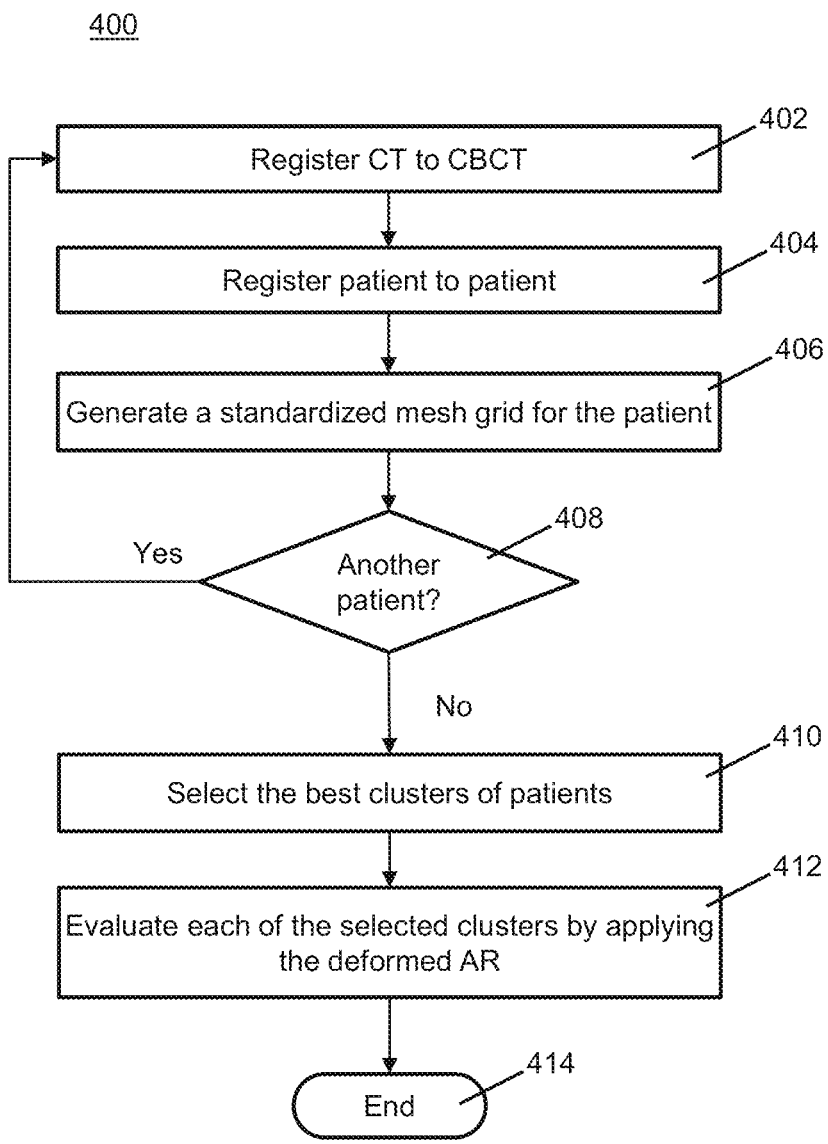
FIG. 4 is a flowchart illustrating a method of learning deformation models.

FIG. 4 illustrates a method 400 of learning deformation models from the medical images of learning patients. At block 402, CT images of a learning patient (e.g., the CT image 302b of FIG. 3) are registered to CBCT images of the learning patient (e.g., the CT image 304 of FIG. 3). The control points are defined in two different coordinate systems: the CT coordinate system and the CBCT coordinate system. The transformation between the CT images and the CBCT images is found by applying TPS to the skeleton of the airways of the CT images relative to the control points and obtaining an equivalent CBCT skeleton in the CBCT coordinate system. Next, the AR between the CBCT skeleton and the distance map of the airways in the CT images are computed. The obtained transformation, which may include a rotation and/or a translation, is applied to the CBCT coordinates of the control points to obtain the movements of the control points solely in the CT coordinate system. In this process, the CBCT coordinate system is "eliminated".

At block 404, the movements of control points are registered between different pairs of learning patients. The CT images of the different learning patients may have different sizes, orientations, and locations. To use the movements of control points from different learning patients together, the movements are normalized to the dimensions and orientation of a reference patient, which may be chosen based on the quality of the reference patient's airways. The scaling in three dimensions may be defined as the ratio of the standard deviations of the pleura points of the reference patient and the current patient to normalize.

The pleura may be obtained from both patients using a lung segmentation algorithm. The lung segmentation algorithm separates the CT images and the CBCT images into separate objects. In particular, the lung segmentation algorithm separates the objects that make up the airways and the vasculature (e.g., the luminal structures) from the surrounding lung tissue.

Those skilled in the art will understand that while generally described in conjunction with CT and CBCT image data, which include a series of CT and CBCT slice images that make up a 3D volume, this disclosure is not so limited and may be implemented using image data acquired using a variety of imaging techniques including magnetic resonance imaging (MM), fluoroscopy, X-Ray, ultrasound, positron emission tomography (PET), and other imaging techniques that generate 3D image volumes without departing from the scope of this disclosure. Further, those skilled in the art will recognize that a variety of different algorithms may be employed to segment the image data sets including connected component, region growing, thresholding, clustering, watershed segmentation, edge detection, or other suitable algorithms for separating different objects within image data sets.

After the CT and CBCT image data sets are segmented, a skeleton is formed. A skeleton is a shape that represents the general form of an object. The skeleton may be formed of multiple skeleton points that identify the centerlines of the objects that make up the segmented volume. There are a variety of techniques that can be employed for skeletonization of a segmented volume to define the skeleton points. For example, these techniques may include topological thinning, shortest path determinations, and distance transformations from the object's boundaries. Any or multiple of these methods may be employed to form skeletons of segmented objects without departing from the scope of thing disclosure.

The AR between the skeleton of the airways of current patient and the distance map of the airways of the reference patient is computed. Automatic registration may involve collecting a point cloud from the airways (referred to as a survey) using a catheter with the magnetic sensor at the tip of the catheter, and then fitting the survey to the image of the airway tree derived from the CT and CBCT image data sets using the lung segmentation algorithm.

Then, the obtained transformation (which may include scaling, rotation, and/or translation) of each patient is applied to the movements of the 3D control points computed in the CT coordinate system. Accordingly, the movements of the 3D control points of all the patients are defined in the CT coordinate system of a reference patient.

At block 406, a standardized or common mesh grid for the current patient is generated. To create mesh grids, the movements of the 3D control points are defined for different three-dimensional (3D) control points for each patient, which depend upon the varying anatomies of the patients. To merge and compare the movements of the 3D control points, the movements are computed on a common mesh grid. The common mesh grid represents the initial position of the 3D control points in first images, e.g., a CT scan. The common mesh grid may be common to all patients in a given set of patients and may be defined as regular and inside the pleura of a reference patient, which may be obtained using the lung segmentation algorithm. The lung segmentation method may segment the lung pleura and the airways with their skeleton. In aspects, the common mesh grid may be referred to as a CT mesh grid, which is a list of 3D control points. For each patient, the thin plate spline (TPS) for interpolation and smoothing is separately applied to the 3D control points of the CT mesh grid relative to the movements of the patients, which are computed in the CT coordinate system of the reference patient. Each patient may have a different list of 3D control points.

At block 408, the inquiry is made whether there are other patient's images that require processing for learning deformation models from the medical images of learning patients. If the answer is yes, the process reverts to block 402 until no more other patient's images are available. If the answer is no, the process continues to block 410 where the other patient's images and registrations are analyzed to identify clusters of patients with which to associate. Specifically, the other patient's images are grouped according to commonalities with the other patient's images. Once so clustered, each cluster is evaluated by applying a deformed automatic registration to the standardized mesh grids of the patients at block 412.

Figure 7:
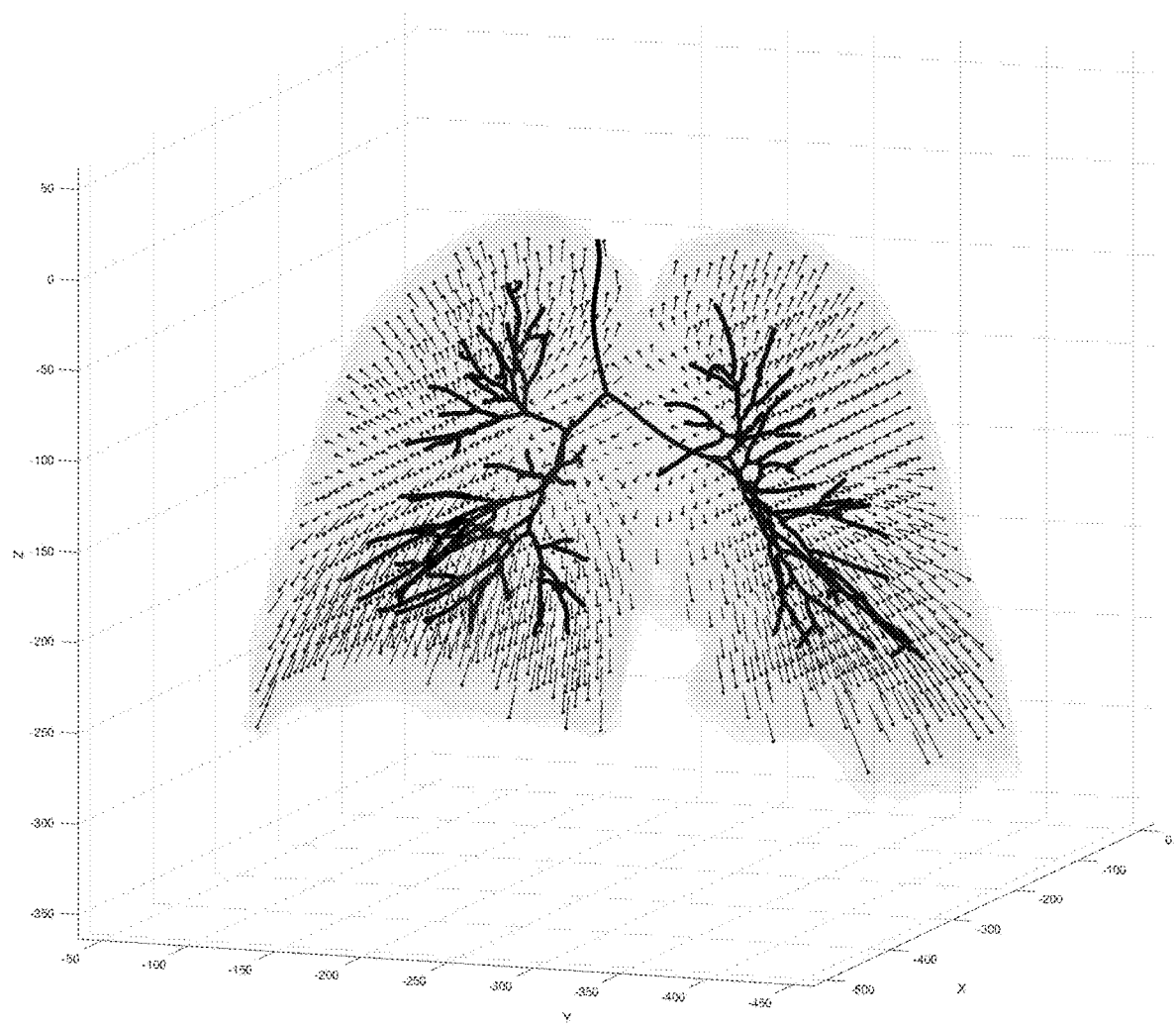
FIG. 7 is a graphical diagram of an example of a contraction deformation model of the lungs based on an average of the movements of the 3D control points of a set of patients.

The deformation models are created for sets of patients of similar characteristics. The movement of a specific patient may be used to predict the movement of the 3D control points of a new patient. This movement of the 3D control points of a specific patient may lack generality and robustness. Thus, an average of or a similar statistic of the movements of the 3D control points of a set of patients may be computed. FIG. 7 shows an example of a contraction deformation model of the lungs based on an average of the movements of 3D control points of a set of twenty patients.

A similarity measure dGrid may be defined between two mesh grids as the average Euclidean distance between the 3D control points associated with the two mesh grids. The similarity measure may be computed between CBCT mesh grids of two patients, between the CBCT grids and the CT mesh grids, and between CBCT mesh grids of a patient and a model mesh grid. The model mesh grid may be the average of the mesh grids of several patients. To perform a complete and fast optimization, a deformation model of movements may be defined with the concept of a sphere as a list of N patients closest to a given center patient for a similarity measure dGrid, which may be expressed as a couple: (center patient, size N).

To find the best deformation models and the best combination of deformation models, several deformation models of movements are found such that any patient has movements similar to one of the several deformation models to obtain the most representative combination of deformation models. For example, in one implementation, the deformation models may include a deformation model for inhale and a deformation model for exhale. All couples and all couples of sizes (triples, n-uples, . . . )—(patCenter1, N1) and (patCenter2, N2)—are then scanned. This defines two lists of patients averaged to a first CBCT mesh grid and a second CBCT mesh grid. For each patient, the minimum of the similarity measure dGrid is computed between the model mesh grid and the first CBCT mesh grid or the second CBCT mesh grid. The score of the combination (center patient 1, N1) and (center patient 2, N2) is the average for all patients of the minima.

Figure 6:
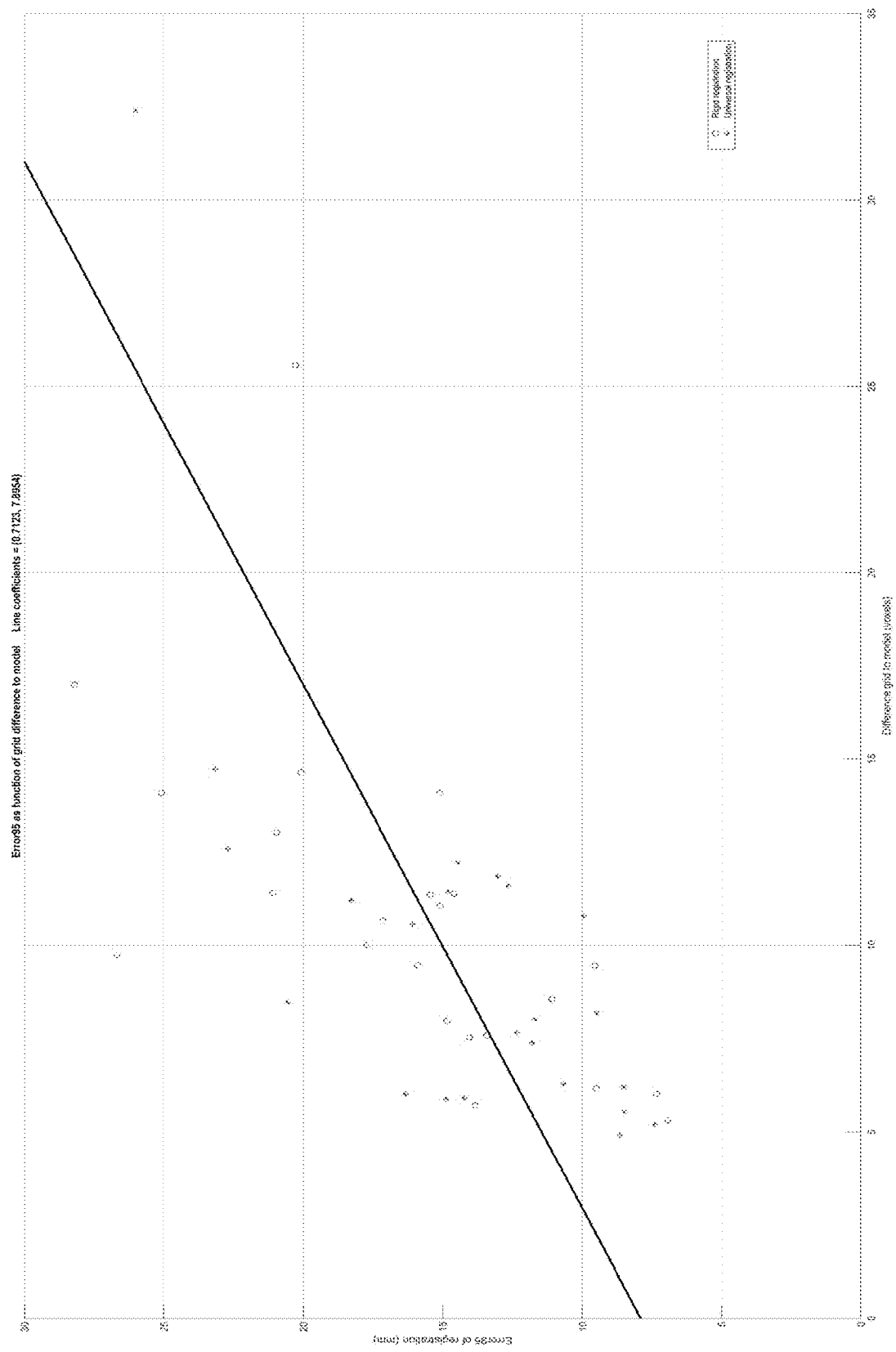
FIG. 6 is a graphical diagram of the error of registration as a function of a difference between a patient mesh grid and a model mesh grid.

FIG. 6 is a graphical diagram of the error of registration as a function of a difference between a patient mesh grid and a model mesh grid in voxels. Each point represents the error of rigid registration for a patient and each circle represents the error of universal registration for a patient. As shown in FIG. 6, the similarity measure dGrid is larger for patients with larger registration errors.

If the combination is representative of common deformations, the combination score is lower. The combinations of models having the minimum score are found and may be referred to as "promising combinations". The computation may be very fast. For example, 1.5 million triples of models may be checked in about 25 minutes. Since all combinations are checked, a type of deformation common to several patients may not be missed. For example, the type of deformation common to several patients may be "the lobe RUL moves to the left for 6 patients". If the learning set is larger, combinations of more models may be used. In aspects, couples of models may be used. For example, clustering may be performed. The clustering may maximize the similarity measure dGrid between patients of the same cluster. Alternatively, or additionally, the clustering may maximize the similarity of any training patient to the closest cluster. In aspects, other suitable clustering algorithms may be employed.

Next, the precision of the selected combinations is checked. The selected combinations may only include good candidates of combinations of deformation models. In one implementation, the deformation model is applied to determine whether the current location of the lesion is correctly predicted. Based on determining the extent to which the current location of the lesion is correctly predicted, the best combination among the selected combinations may be found.

The methods of this disclosure include predicting the movement of a new patient by applying the learned deformation models to the new patient. The learned deformation models are first applied to the images of the patients of the training set. Then, the best combination of deformation models, which lead to the minimum error of the predicted location of the lesions, is selected. Next, the best combination of deformation models is applied to a validation set to determine that there is no overfitting and true results are obtained with a new, unknown patient. At block 502, both the deformation models and the CT images for a new patient are received.

At block 504, CT images of a new patient are registered to CT images of a reference patient to obtain a transformation (e.g., a scaling, a rotation, and/or a translation). At block 506, the transformation is applied to pairs or couples of movements of the control points of the model in the CT coordinate system of the new patient. In aspects, the inverse of the transformation is applied to each of the two or more deformation models in order to obtain the equivalent deformation models in the CT coordinate system of the new patient.

The deformation models are then applied to the new patient map data in the CT coordinate system to create deformed maps. The new patient map data may include a distance map of the airways, a skeleton of the airways, and/or a location of one or more targets, which are derived from or created based on the new patient preoperative imaging data. For example, at block 508, the deformation model is applied to new patient targets in the CT coordinate system using a thin plate spline (TPS) or any other suitable interpolation and smoothing technique to create deformed CT targets. At block 510, the deformation model is applied to the new patient map data using TPS to create deformed map data, e.g., a deformed distance map and/or a deformed skeleton. The TPS may fit the new patient map data to a mapping function between the control points of the movements of the deformation model that minimizes an energy function.

Thus, for each deformation model, there may be one different distance map of the airways, one different skeleton of airways, and/or one different location of one or more targets, e.g., lesions. At block 512, AR is applied between 3D locations of a catheter sampled by a user in the navigation system coordinates during an operation and each of the sets of deformed data, e.g., deformed distance maps, deformed skeletons, and/or deformed targets. The set of 3D locations may be collected at the beginning of the operation. This collection process may be referred to as automatic registration survey. In other implementations, other suitable field measures may be used to find a deformation model corresponding to the actual deformation data. At block 503, the AR between 3D locations and the unmodified, original distance map is computed.

Figure 8A:
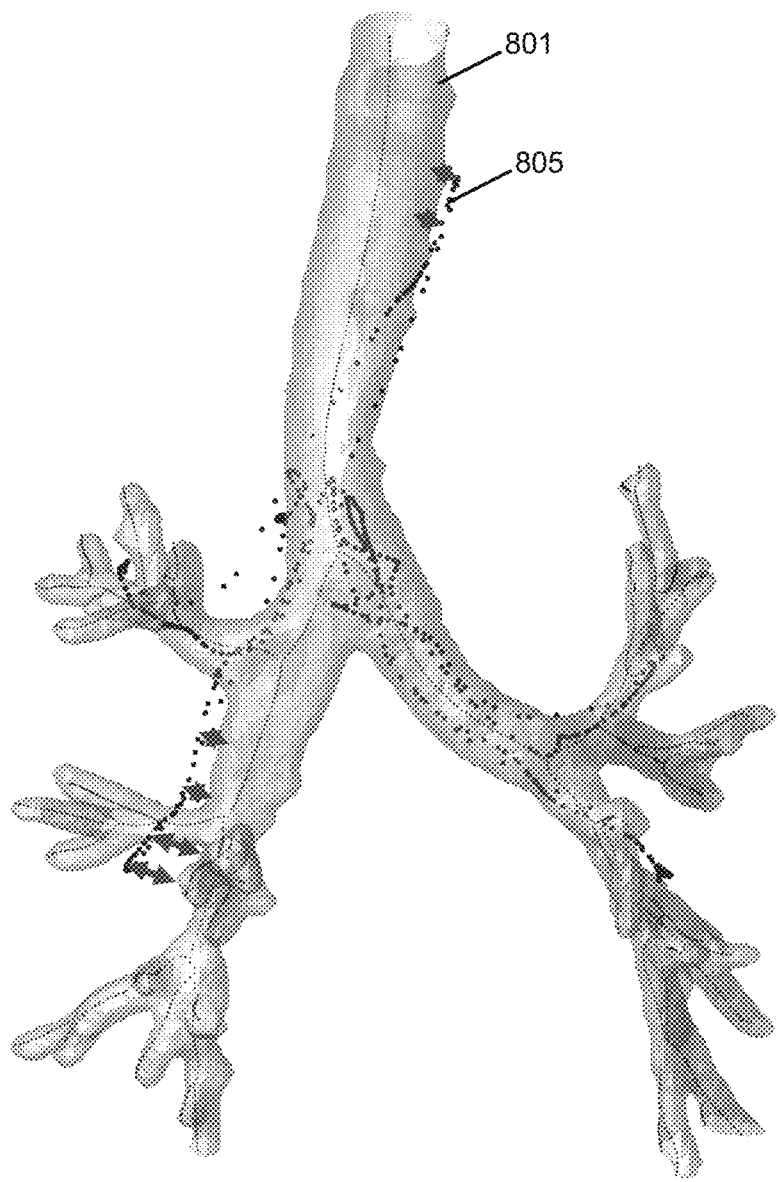
FIG. 8A is a perspective view of an example of an original distance map and registration to 3D patient samples.
Figure 8B:
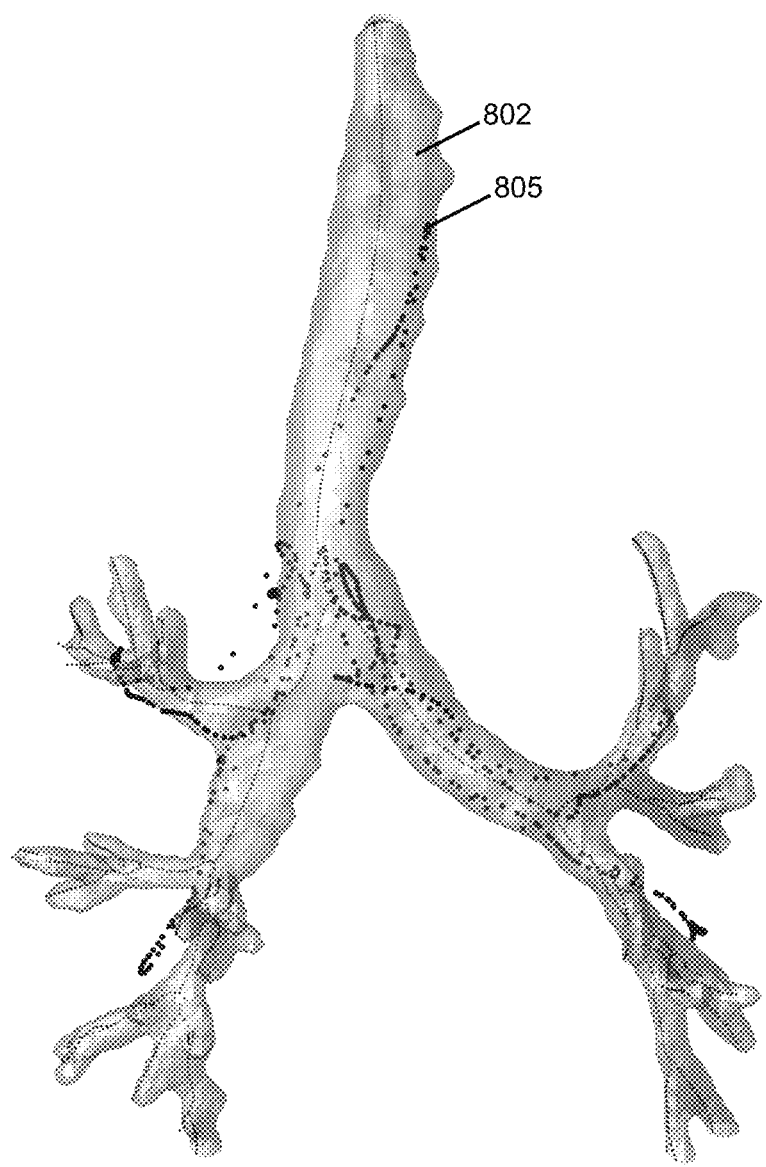
FIG. 8B is a perspective view of an example of a deformed distance map and registration to the 3D patient samples of FIG. 8A.

If there are multiple potential deformation models, the deformation model that best fits the intraoperative survey is selected. For example, a deformation model is selected at block 514 based on determining whether the original distance map fits the 3D locations the best or the deformed distance map fits the 3D locations the best. For example, the deformed distance map 802 of FIG. 8B fits the 3D sample locations 805 better than the original distance map 801 of FIG. 8A. Thus, in the case of FIGS. 8A and 8B, the deformed distance map 802 would be selected at block 514.

At blocks 516 and 518, the transformation associated with the selected model is then applied to the deformed target, e.g., the deformed lesion, to precisely estimate the location of the target. Specifically, if the original distance map fits the 3D samples the best, a new location of the target is estimated by applying the original distance map to the original targets at block 516. On the other hand, if the deformed distance map fits the 3D samples the best, a new location of the target is estimated by applying the deformed distance map to the deformed targets at block 516. For example, in the case of FIGS. 8A and 8B, since the deformed distance map 802 fits the 3D samples better than the original distance map 801, a new location of the target is estimated by applying the deformed distance map to the deformed targets at block 516. In aspects, the selected deformation model may also be applied to airways, which are also subject to lung deformations. The method 500 then ends at block 520.

Though described hereinabove with respect to image processing and generation of deformation models, the application is not so limited. Rather a variety of practical applications of these methods. For example, in the context of intraluminal navigation whether via EM navigation or other sensors based navigation using for example shape sensors or ultrasound sensors, the deformation models described herein can be used to minimize or eliminate CT-to-body divergence that is the result of pre-procedure CT images, used for generation of a 3D model, being taken at a different time and lung state than what the clinician finds when the patient is undergoing a procedure.

Figure 5:
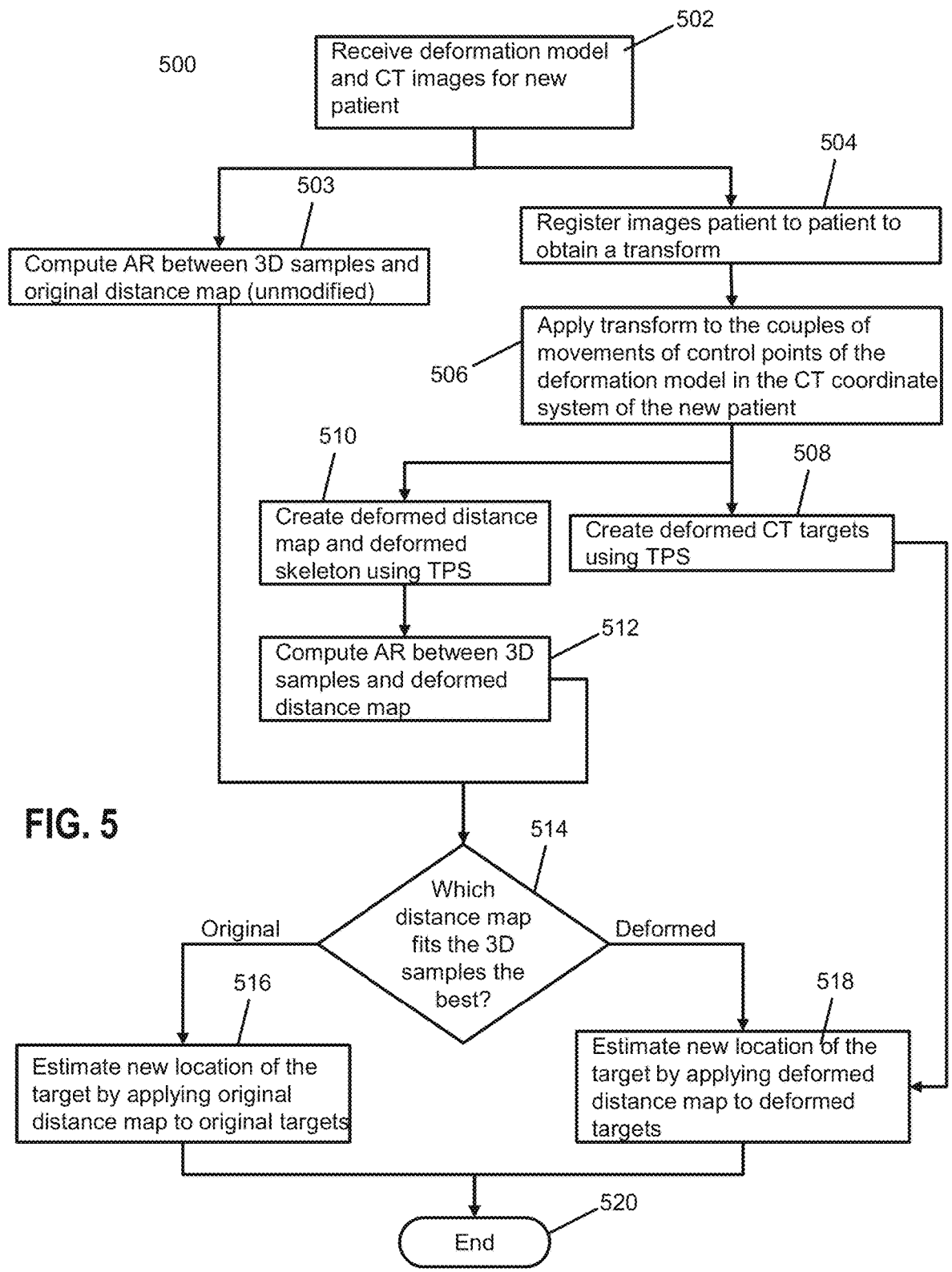
FIG. 5 is a flowchart illustrating a method of predicting the movement of a target in a new patient using the deformation models.

Accordingly, utilizing the deformation methods described herein, for example as described with reference to FIG. 5, an initial CT image data set of a patient can be acquired. The clinician undertakes all of the standards pathway planning methods as described herein and generally understood to generate a pathway to one or more targets within the luminal network of the patient. As will be appreciated the initial CT image data set also defined a CT volume. Using the deformation modeling methods described herein, that CT volume (which includes 3D models derived therefrom) can be deformed using the methods described herein. This deformation of the CT volume will transform the pathway plan, including any manual registration points or other features in the original CT volume.

At the initiation of the navigation procedure the deformed CT volume and 3D model are loaded into the navigation system and displayed. This 3D model is then used for navigation of the catheter guide assemblies 90, 100 through the luminal network of the patient. Other aspects of the procedure should be similar to the existing procedure, in that a registration step may be undertaken to register the actual airways of the patient with the deformed 3D volume and 3D model. The deformed 3D model should more accurately simulate the actual physiology of the patient's luminal network thus reducing or eliminating the CT-to-body divergence.

Alternatively, rather than deforming the CT volume and the 3D model derived therefrom, the original CT volume and 3D model may be employed and displayed on the display during a navigational procedure. In this case, after calculating the registration to the deformed CT volume the deformation can be applied to such that the detected position of the sensor 94 is accurately depicted in the 3D volume and 3D model from the pre-procedure CT image. To achieve this, the detected sensor 94 position is initially transformed to the deformed CT coordinate system. As a second step the sensor position in the deformed CT coordinate system is transformed to the original CT coordinate using the deformation processes described herein. As a result, the relative position of the sensor 94 at any position within the patient can be accurately depicted within the original CT volume and 3D model, despite the physical shape and of the luminal network (e.g., airways) are different in the patient undergoing the navigation procedure than when the original CT images were generated.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules associated with, for example, a medical device.

In one or more examples, the described techniques may be implemented in hardware, software, firmware, or any combination thereof. If implemented in software, the functions may be stored as one or more instructions or code on a computer-readable medium and executed by a hardware-based processing unit. Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements.

What is claimed is:

1. A method comprising:
receiving, for each patient of a set of patients, preoperative imaging data of a first imaging modality and intraoperative imaging data of a second imaging modality;
registering, for each patient of the set of patients, the preoperative imaging data of the first imaging modality to the intraoperative imaging data of the second imaging modality;
registering preoperative imaging data of each patient to preoperative imaging data of other patients;
registering different deformations of the set of patients into a common deformation space, yielding different possible deformations;
generating a set of deformation models representing the different possible deformations;
applying each deformation model of the deformation models to preoperative imaging data of a new patient to obtain deformed imaging data for each deformation model;
comparing, for each deformation model, the deformed imaging data to intraoperative data of the new patient; and
determining the deformation model that best fits the intraoperative imaging data of the new patient based on the comparing.

2. The method of claim 1, wherein the intraoperative data of the new patient includes at least one of imaging data or navigation data.

3. The method of claim 1, wherein registering the images of the preoperative imaging data to images of the intraoperative imaging data includes at least one of rotating and translating the images of the preoperative imaging data.

4. The method of claim 1, wherein registering the images of the preoperative imaging data with each other includes at least one of scaling, rotating, and translating the images of the preoperative imaging data.

5. The method of claim 1, wherein the first imaging modality is computed tomography (CT) and the second imaging modality is cone beam CT (CBCT).

6. The method of claim 1, wherein registering the images of the preoperative imaging data to the images of the intraoperative imaging data includes:
applying an interpolation process to an airway skeleton of the images of the preoperative imaging data to obtain an equivalent airway skeleton in a coordinate system of the images of the intraoperative imaging data;
performing automatic registration between the equivalent airway skeleton and an airway distance map of the images of the preoperative imaging data to obtain a transformation; and
applying the transformation to coordinates of second 3D control points of the images of the intraoperative imaging data to obtain movement of the second 3D control points in the coordinate system of the images of the preoperative imaging data.

7. The method of claim 6, wherein the interpolation process includes a thin plate spline (TPS) process.

8. The method of claim 6, wherein registering the images of the preoperative imaging data with each other includes:
selecting a reference image of the preoperative imaging data;
performing registration between an airway skeleton of a current image of the preoperative imaging data and the airway distance map of the reference image of the preoperative imaging data to obtain a second transformation; and
applying the second transformation to the movement of the second 3D control points.

9. The method of claim 8, further comprising:
creating a mesh grid for first 3D control points of the reference image of the preoperative imaging data; and
applying an interpolating process to the mesh grid relative to the movement of the first 3D control points of the current image of the preoperative imaging data to obtain a standardized mesh grid.

10. The method of claim 1, further comprising:
determining a similarity measure between mesh grids of pairs of images of the preoperative imaging data, respectively; and
generating a first deformation model of images of the preoperative imaging data closest to a first center image of the preoperative imaging data based on the similarity measure.

11. The method of claim 10, wherein the similarity measure between two mesh grids is an average Euclidean distance between first 3D control points of two images of the preoperative imaging data, respectively.

12. The method of claim 10, wherein the similarity measure is between two mesh grids of the images of the intraoperative imaging data, between mesh grids of an image of the preoperative imaging data and an image of the intraoperative imaging data, or between a mesh grid of an image of the intraoperative imaging data and a model grid.

13. The method of claim 10, further comprising:
generating a second deformation model of images of the preoperative imaging data closest to a second center image of the preoperative imaging data based on the similarity measure;
for each patient, computing a minimum of the similarity measure and each of the mesh grids of the first deformation model and the second deformation model to obtain scores; and
selecting the first deformation model or the second deformation model having a lowest score to perform a transformation.

14. The method of claim 9, wherein the first and second 3D control points are crossing points of at least one of arteries, veins, and airways in the images of the preoperative imaging data and the images of the intraoperative imaging data, respectively.

* * * * *